(12) United States Patent
Koyama

(10) Patent No.: US 6,246,056 B1
(45) Date of Patent: Jun. 12, 2001

(54) EARTH SENSOR

(75) Inventor: Hideaki Koyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/172,471

(22) Filed: Oct. 14, 1998

(30) Foreign Application Priority Data

Oct. 14, 1997 (JP) .................................................. 9-280891

(51) Int. Cl.$^7$ ........................................................ G05D 1/00
(52) U.S. Cl. .................................. 250/339.14; 250/203.6
(58) Field of Search .............................. 250/203.6, 342, 250/339.14

(56) References Cited

U.S. PATENT DOCUMENTS

| | | |
|---|---|---|
| 3,697,760 | 10/1972 | Biet et al. . |
| 5,309,230 | * 5/1994 | Blondel et al. ........................ 348/164 |
| 5,721,431 | * 2/1998 | Hersom et al. ........................ 250/342 |
| 6,026,337 | * 2/2000 | Krigbaum et al. ................. 250/203.6 |

FOREIGN PATENT DOCUMENTS

| | | |
|---|---|---|
| 0405678 | 1/1991 | (EP) . |
| 2764976 | 12/1998 | (FR) . |
| 61-20480 | 5/1986 | (JP) . |
| 61-200099 | 9/1986 | (JP) . |

OTHER PUBLICATIONS

K. Nakamura, et al., "Pyroelectric Infrared Detector for Precision Earth Sensor", International Journal of Infrared and Millimeter Waves, vol. 10, No. 8, 1989, pp. 907–930.

F. Takahashi, et al., "Development of Precision Earth Sensor for ETS–VI Satellite", NEC Research & Development, No. 97, Apr. 1990, pp. 35–42.

* cited by examiner

Primary Examiner—Constantine Hannaher
Assistant Examiner—Otilia Gabor
(74) Attorney, Agent, or Firm—Ostrolenk, Faber, Gerb & Soffen, LLP

(57) ABSTRACT

An apparatus for determining the attitude of an orbiting spacecraft includes an optical system for generating an image on a substrate of a body around which the spacecraft is orbiting, an infrared detector positioned on the substrate in the form of a non-cooled two-dimensional array of pixels disposed in a spaced relationship forming rows and columns, the rows extending in a first direction, and the columns extending in a second direction perpendicular to the first direction, a scanner and an addressing controller for the scanner, the controller and the scanner cooperating to scan the pixels along a predetermined scan path which zig-zags between adjacent rows and columns of pixels, and a computation circuit responsive to the succession of pixel output signals along the scan path to calculate pitch and roll angle changes of the spacecraft according to changes in the image of the orbited body in the first and second direction.

19 Claims, 7 Drawing Sheets

Fig.7 PRIOR ART
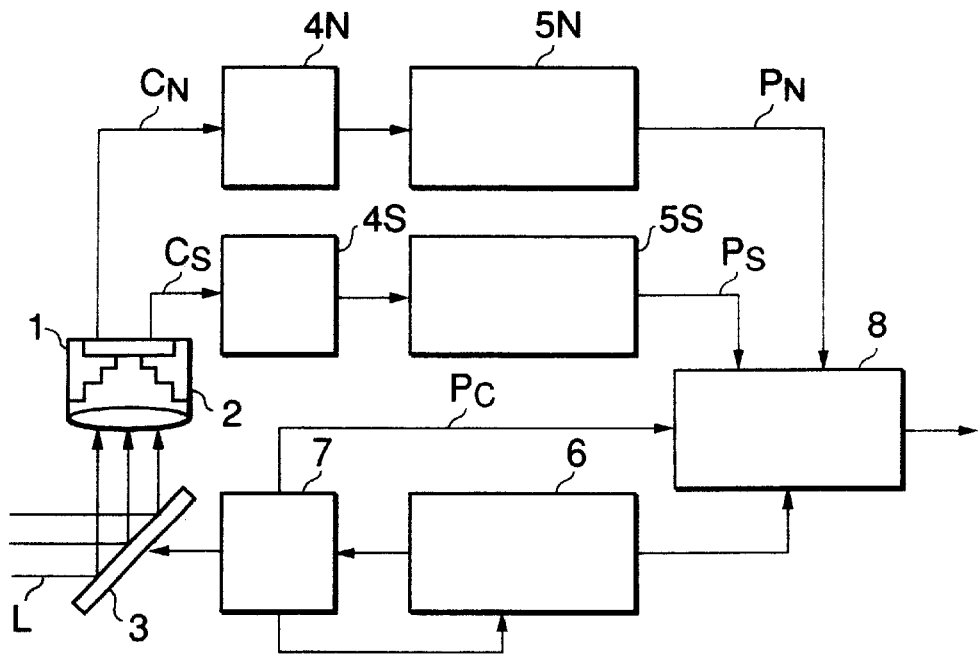
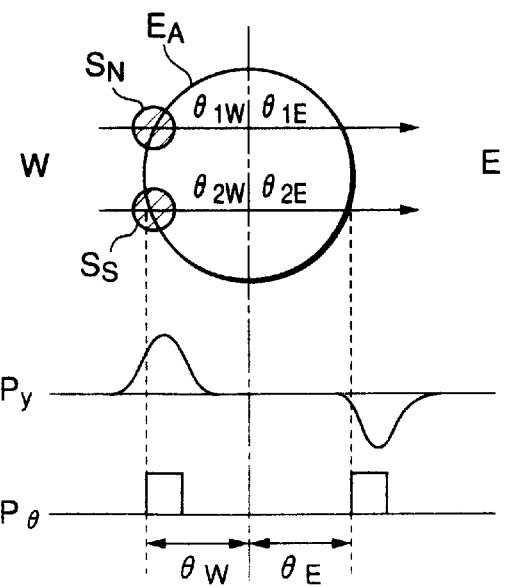
Fig.8(a) PRIOR ART
Fig.8(b) PRIOR ART
Fig.8(c) PRIOR ART

EARTH SENSOR

BACKGROUND OF THE INVENTION

1. Field of the Invention

The present invention relates to an earth sensor which is mounted on a satellite or the like and which can stably perform an attitude detection at a high precision.

2. Description of the Related Art

Heretofore, as a system of a sensor for executing an attitude control of a satellite or the like or detecting pointing angles of an observation sensor, there are various systems such as mirror scan type, static thermal irradiation balance type, conical scan type, and mechanical chopping type. Particularly, as for a geosynchronous satellite in which long life and a high precision attitude measurement are demanded, a two-axis earth sensor of a mirror scan type has been solely used in many cases.

FIG. 7 shows a constructional diagram showing an example of a conventional earth sensor of the mirror scan type. In the diagram, reference numeral 1 denotes an infrared photodetector comprising a pair of single elements, namely, a north scanning element for receiving lights which are spot beams used for scanning of the north side of the earth and a south scanning element for receiving lights which are spot beams used for scanning of the south side; 2 an optical package for enclosing the infrared photodetector 1; and 3 a mirror for reflecting lights L which are spot beams used for the scanning, thereby impinging on the photodetector 1.

Reference numeral 4N denotes a preamplifier for a signal of the north scanning element; 4S a preamplifier for a signal of the south scanning element; 5N a comparator which is connected to the preamplifier 4N and which forms a pitch pulse; 5S a comparator which is connected to the preamplifier 4S and which forms a pitch pulse; 6 a mirror scan drive control unit; 7 a drive unit which has a drive coil and an angle encoder and which outputs center pulses; and 8 an angle generator (signal processing unit) for obtaining an angle between the center of the earth and the west end and an angle between the center of the earth and the east end on the basis of pitch pulses $P_N$ and $P_S$ from the comparators 5N and 5S and a center pulse $P_c$ from the drive unit 7.

In the earth sensor, as shown in FIG. 8(a), a spot beam $S_N$ is allowed to scan the north side of the earth $E_A$ from west to east, and a spot beam $S_S$ is allowed to scan the south side of the earth from west to east. The lights L which are the spot beams $S_N$, $S_S$ used for the scanning, are received by the single elements of the infrared photodetector 1 and signals $C_N$ and $C_S$ each having a waveform $P_Y$ as shown in FIG. 8(b) are generated. Those signals $C_N$ and $C_S$ are amplified by the preamplifiers 4N and 4S, respectively. The pitch pulses $P_N$ and $P_S$ each having a waveform $P_\theta$ as shown in FIG. 8(c) are formed by the comparators 5N and 5S.

After that, on the basis of the pitch pulses $P_N$ and $P_S$ from the comparators 5N and 5S and the center pulse $P_C$ from the drive unit 7, angles $\theta_{1W}$ and $\theta_{2W}$ between the center of the earth and the west end and angles $\theta_{1E}$ and $\theta_{2E}$ between the center of the earth and the east end are obtained by the angle generator 8. By using those obtained angles $\theta_{1W}$, $\theta_{2W}$, $\theta_{1E}$, and $\theta_{2E}$, a pitch angle $\theta_P$ and a roll angle $\theta_R$ between the center of the earth and an optical axis of the earth sensor are obtained on the basis of the following expressions.

$$\theta_P = \frac{1}{4}(-\theta_{1W} - \theta_{2W} + \theta_{1E} + \theta_{2E})$$

$$\theta_R = \frac{1}{2}(\theta_{1W} - \theta_{2W} + \theta_{1E} - \theta_{2E})$$

As an example of the earth sensor having a construction other than the above, there is the mirror scan type two-axis earth sensor disclosed in Japanese Patent Application Laid-Open No. 61-200099 (1986). The earth sensor uses a division mirror arranged so as to enable to scan the upper half portion and the lower half portion of the earth and a scan mirror for reciprocatingly scanning the upper half portion and the lower half portion of the earth right and left.

As another example, there is the earth sensor disclosed in Japanese Patent Application Publication Laid-Open No. 61-20480 (1986). The earth sensor is constructed in such a manner that a plurality of infrared detectors for detecting an image of the earth are placed to a periphery of a substrate on which a thermal infrared image of the earth is formed.

As a first problem point of the conventional earth sensor, there is a problem that when the sensor is mounted on the satellite, a mechanical vibration of a satellite body which the satellite has interferes in the mirror drive unit of the earth sensor, so that such an inconvenience that the mirror drive unit causes mechanical resonance occurs.

For example, when frequency components of a wheel, a solar paddle drive unit, the other devices having the mechanical vibration, and the like are resonated with a mirror torsion bar of the earth sensor, such an inconvenience that a normal mirror scan cannot be performed or the like occurs.

As a second problem point, there is a point that in the conventional earth sensor, since its mechanical vibrating mechanism system occupies a large area of the whole structure, a realization of compactness and light-weightedness is close to limits, so that it is difficult to realize to further improve the compactness and the light-weightedness.

SUMMARY OF THE INVENTION

The present invention is made in consideration of the above situations and it is an object to provide an earth sensor in which there is no fear that a mechanical resonance is caused, which can stably perform an attitude detection at a high precision, and in which the compactness and light-weightedness can be realized.

In order to solve the above problems, according to the invention, there is provided an earth sensor which will be described hereinbelow.

That is, there is provided a sensor comprising: a substrate which is mounted on a satellite or the like and on which an image of the earth is formed; an infrared detector which is placed on the substrate and which detects the image; and a signal processing unit for processing an output signal of the infrared detector, wherein the infrared detector has a plurality of pixels arranged at predetermined intervals, and wherein output signal is formed by scanning the pixels in a first scan direction, and in a second direction which crosses the scan direction at a right angle.

In one preferred embodiment, the plurality of pixels are arranged on the substrate in a matrix manner. It is also preferred that the diagonal lines of the substrate are oriented to coincide with the above-mentioned first and second scan directions. It is further preferred that the detector be scanned electronically. A non-cooling two dimensional array is preferably used as the infrared detector.

According to the earth sensor of the invention, the center of the infrared detector having a plurality of pixels is aligned perpendicular to the optical axis of the earth sensor. Angles $\theta_E$, $\theta_W$, $\theta_S$, and $\theta_N$ between a pixel of the center and pixels of the end portions in the directions of the east, west, south, and north are obtained by counting the number of pixels from the center pixel up to the pixels of the end portions in the directions of the east, west, south and north. A pitch angle $\theta_P$ and a roll angle $\theta_R$ between the center axis of the earth and the optical axis of the earth sensor are obtained on the basis of angles $\theta_E$, $\theta_W$, $\theta_S$, and $\theta_N$ Consequently, by counting the number of pixels from the pixel at the center of the infrared detector up to the pixels of the end portions, the pitch angle $\theta_P$ and the roll angle $\theta_R$ made by the earth center axis and the optical axis of the earth sensor can be obtained, the mechanism such as a conventional mirror drive unit which causes vibration is not needed, there is no fear that mechanical resonance with the mechanism is caused, so that the high precision pitch angle $\theta_P$ and roll angle $\theta_R$ can be obtained in a stable state. Therefore, it is possible to detect attitude in a stable environment with high precision.

Since the mechanical vibrating mechanism system such as a conventional mirror drive unit is not needed, it is also possible to realize compactness and light-weightedness.

BRIEF DESCRIPTION OF THE DRAWINGS

FIG. 7 is a constructional diagram showing a conventional earth sensor.

FIGS. 8(a) to 8(c) are graphs showing a relation between a detecting element and output signals of the conventional earth sensor.

DETAILED DESCRIPTION OF THE PREFERRED EMBODIMENTS

Embodiments of an earth sensor of the present invention will now be explained on the basis of the drawings.

[First embodiment]

Figure 1:
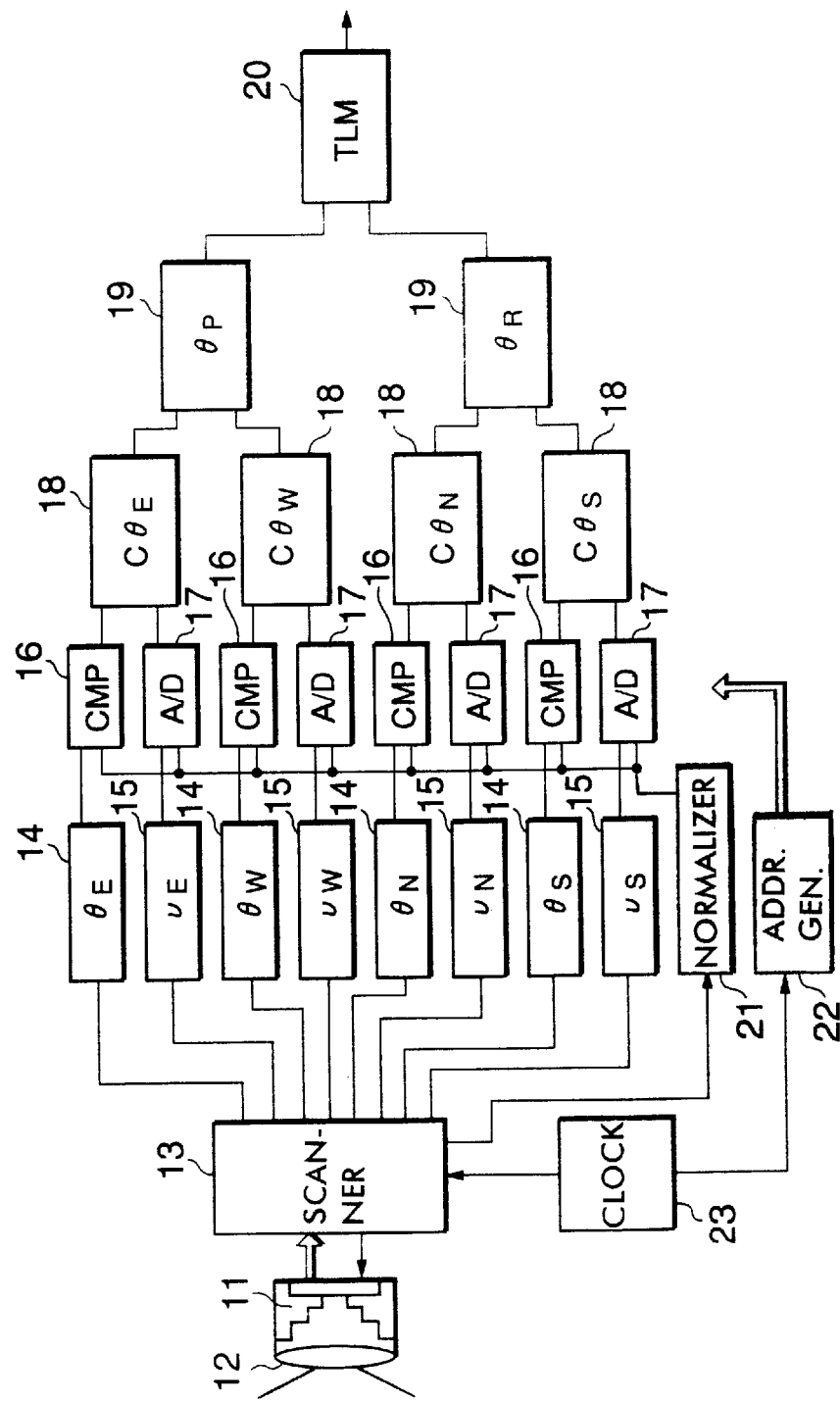
FIG. 1 is a constructional diagram showing an earth sensor of the first embodiment of the present invention.

FIG. 1 is a constructional diagram showing an earth sensor of the first embodiment of the invention. In the diagram, reference numeral 11 denotes a non-cooling two-dimensional array detecting element (infrared detector: hereinbelow, referred to as a detecting element) having a plurality of pixels; 12 is an optical package for enclosing the detecting element 11; 13 is a scanning circuit; 14 is an output circuit for signals $\theta_E$, $\theta_W$, $\theta_S$, and $\theta_N$ corresponding to the east, west, south and north pixel count; and 15 is analog peak holders ($V_E$, $V_W$, $V_S$, and $V_N$) between pixels.

Reference numeral 16 denote comparators connected respectively to the output circuits 14 for the east, west, south, and north pixel count signals $\theta_E$, $\theta_W$, $\theta_S$, and $\theta_N$. Each comparator executes a normalization with reference to an average pixel output value and, after that, performs a comparison. Reference numeral 17 denotes A/D converters respectively provided for each of the analog peak holders ($V_E$, $V_W$, $V_S$, $V_N$) between the pixels. Each of A/D converter 17 converts the signal normalized by a reference output in a manner similar to the comparator 16.

Reference numeral 18 denotes adders for adding $\theta_E$, $\theta_W$, $\theta_S$, and $\theta_N$ and $V_E$, $V_W$, $V_S$, and $V_N$ for the respective east, west, south and north pixel counts, thereby obtaining ($\theta_E+V_E$), ($\theta_W+V_W$), ... ; 19 denotes angle generators for forming the pitch angle $\theta_P$ from $\theta_E$ and $\theta_W$ and the roll angle $\theta_R$ from $\theta_N$ and $\theta_S$, respectively; and 20 is a telemetry data processor for joining the pitch angle $\theta_P$ and the roll angle $\theta_R$ and generating the resultant angle as telemetry data. A signal processing unit is constituted by the adders 18, angle generators 19, and telemetry data processor 20.

Reference numeral 21 denotes an analog signal normalizer for forming a mean infrared intensity of the earth and setting it as a reference level for use by comparator circuits 16 and A/D converters 17; 22 is an address generator for forming an address signal to read out $\theta_E$, $\theta_W$, $\theta_S$, $\theta_N$ $V_E$, $V_W$, $V_S$, and $V_N$; and 23 is a reference clock generator.

Figure 2:
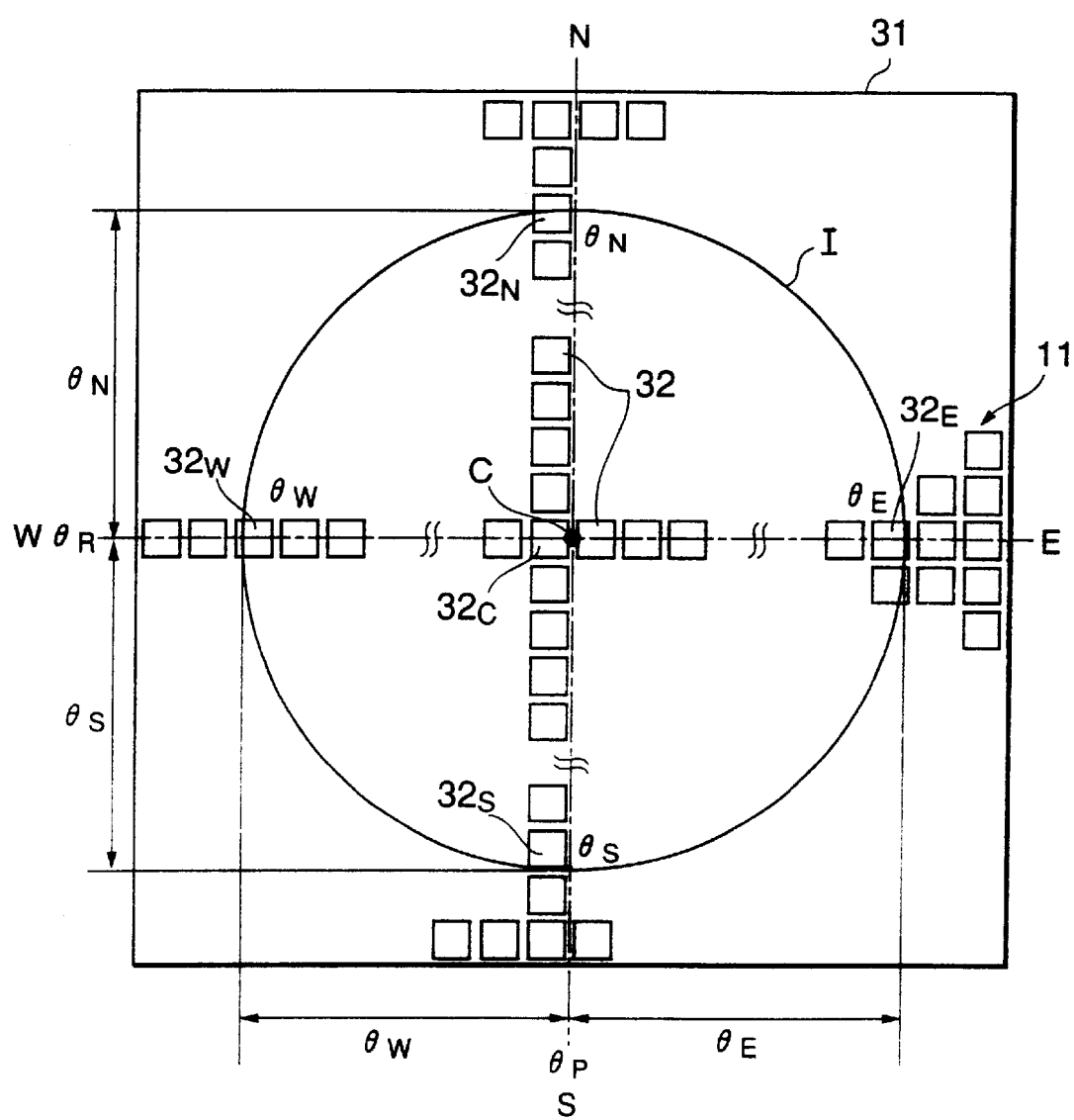
FIG. 2 is a plan view showing a detecting element of the earth sensor of the first element of the invention.

With reference to FIG. 2, the detecting element 11 is placed on a substrate 31 on which an image I of the earth is formed by optical package 12. In the detector, a plurality of pixels 32 are arranged at predetermined spatial intervals in the east and west (E-W) direction along the electronic scan path as a pitch angle measuring direction and in the north and south (N-S) direction (which crosses the electronic scan at a right angle) as a roll angle measuring direction of the substrate 31, respectively. In this instance, since the scan is actually performed in the E-W direction, roll angle cannot be measured directly. Accordingly, an indirect measurement is performed by selecting the pixels 32 located at the center of each of the scans in the east and west direction and using these to create a synthesized line running in the north-south direction.

In the earth sensor, the pitch angle $\theta_P$ and the roll angle $\theta_R$ made between the center axis of the earth and the optical axis of the earth sensor are obtained on the basis of the image I of the earth by the detecting element 11.

First, the center C of the detecting element 11 is set to the optical axis of the earth sensor and the number of pixels from a pixel 32C of the center C of the detecting element 11 up to a pixel $32_W$ on the west end is counted, thereby obtaining $\theta_W$. Similarly, $\theta_E$ is obtained by counting the number of pixels from the pixel 32C to a pixel $32_E$ on the east end.

If the number of pixels 32 is sufficiently large, it is possible to obtain an adequate level of precision by merely counting the number of pixels. When it is desired to further improve the precision, however, it is preferred that analog levels of the pixels $32_W$ and $32_E$ on the east and west ends are read, respectively.

Figure 3:
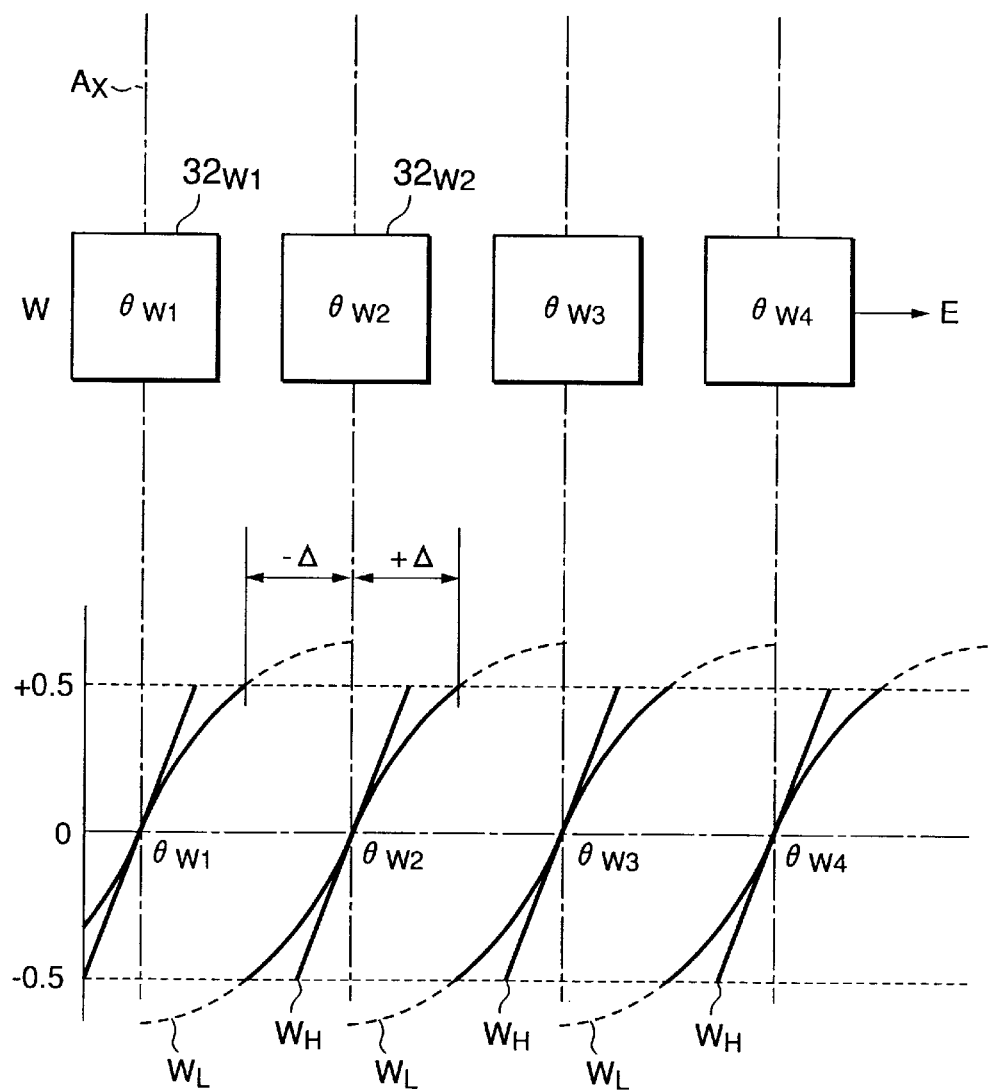
FIG. 3 is a graph showing a relation between pixels and output signals of the detecting element of the earth sensor of the first embodiment of the invention.

FIG. 3 is a diagram showing a relation between the pixels 32 and output signals when an optical axis $A_X$ of the earth sensor is moved form the west W to the east E in the pitch angle direction (east and west direction).

In the diagram, a leading edge of the waveform is changed because the angle corresponding to the atmosphere of the earth is different depending on the altitude of the satellite. For example, in a low orbit, although the waveform becomes non-linear at the end of the pitch width of the pixel 32, a continuity of the signal can be held due to a report of a waveform $W_L$.

In this instance, i.e., a low orbit, when the optical axis $A_X$ of the earth sensor moves form a pixel $32_{W1}$, onto a pixel $32_{W2}$, corresponding to a micro angle fluctuation of the pitch angle $\theta_P$, the angle can be read in a conventional manner by approximating an angle of the output to the line or setting it to the curve in a range of $+\Delta$ and $-\Delta$. That is, the pitch angle $\theta_P$ can be expressed by $-\theta_{W2}\pm\Delta$. The roll angle $\theta_R$ can also be expressed by the method that is entirely similar to that of the pitch angle $\theta_P$.

In the earth sensor, the pitch angle $\theta_P$ and roll angle $\theta_R$ can be obtained by the following equations.

$$\theta_P=\tfrac{1}{2}\{\theta_E+V_E-(\theta_W+V_W)\}=\tfrac{1}{2}(\theta_E-\theta_W+V_E-V_W)$$

$$\theta_R=\tfrac{1}{2}\{\theta_N+V_N-(\theta_S+V_S)\}=\tfrac{1}{2}(\theta_N-\theta_S+V_N-V_S)$$

According to the earth sensor of the embodiment, since the non-cooling two-dimensional array infrared detecting element 11 having the plurality of pixels is used, a static earth sensor can be constructed. Since the mechanical vibrating mechanism system for the through scan such as a conventional mirror drive unit is unnecessary, there is no fear that mechanical resonance with those mechanisms is caused. Therefore, the high precision pitch angle $\theta_P$ and roll angle $\theta_R$ can be obtained in a stable state and the attitude detection can be stably executed at a high precision.

Since the electronic scan is executed by the non-cooling two-dimensional array infrared detecting element 11, the mechanical vibrating mechanism system such as a conventional mirror drive unit is not needed, so that a small and light earth sensor can be constructed.

As will be readily understood by those skilled in the art, for the earth sensor as shown in FIG. 3, the continuity of the signal between pixels can be maintained by the repeat of the waveform $W_L$ in the low orbit. In a high orbit, however, since a dead zone exits in the end of the pitch width of each pixel 32, due to reduced atmospheric influence when the angle change is sufficiently large that it falls in the dead zone, the repeat of the waveform WH becomes discontinuous, so that the angle change cannot be continuously measured.

Although pixels 32 exist over the whole area of the pitch width of the detecting element 11, some dead zone between the pixels 32 cannot be avoided. Accordingly, when the altitude of the satellite is changed, there is the possibility that the measured angle between the pixels will become discontinuous, the linearity is lost and the measuring precision is decreased.

The limiting effects of the number of pixels 32 in the detecting element 11 on the resolution, etc. in high altitude applications can be avoided by earth sensor of the second embodiment which will be explained hereinbelow.

[Second embodiment]

Figure 4:
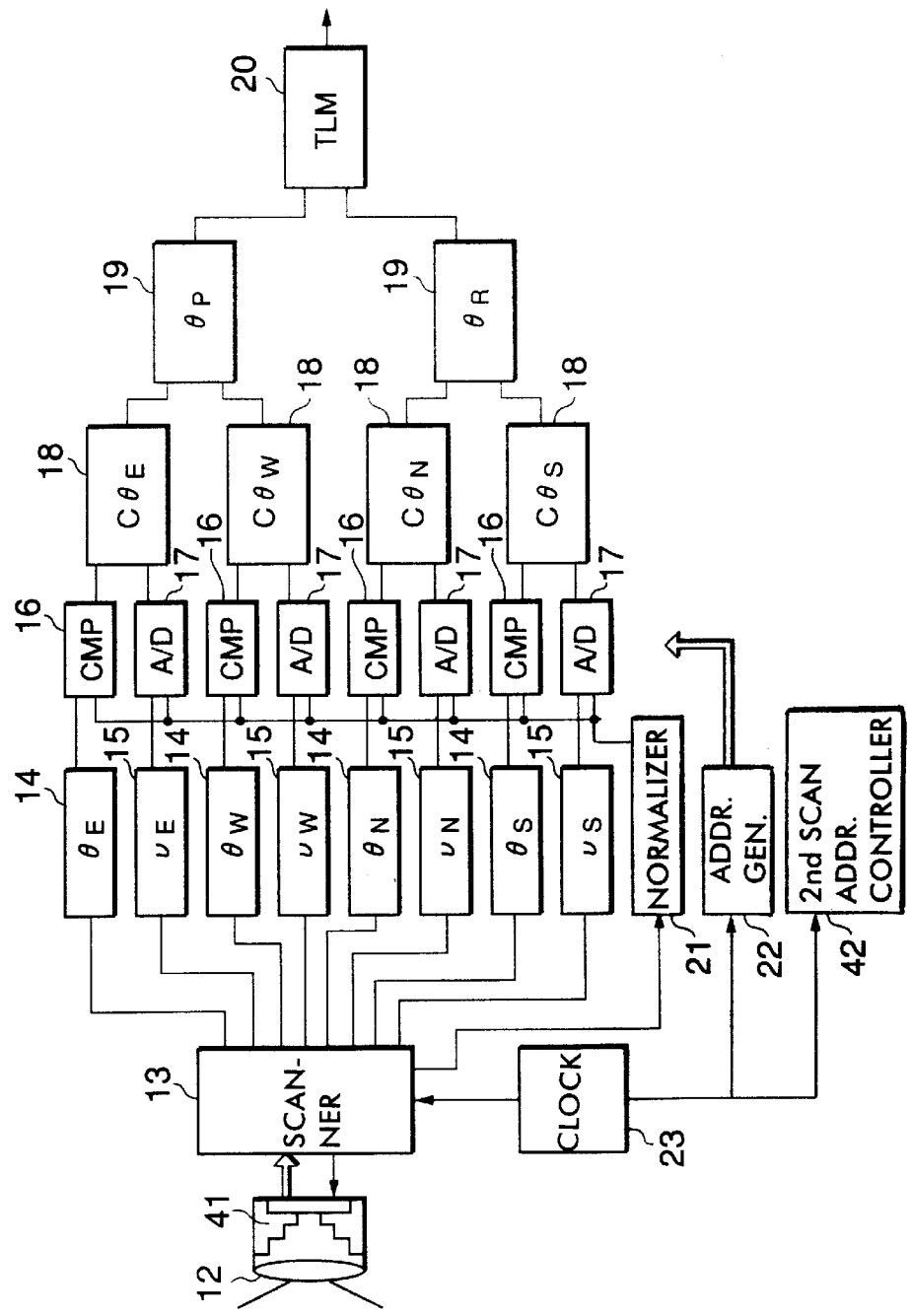
FIG. 4 is a constructional diagram showing an earth sensor of the second embodiment of the invention.

FIG. 4 is a constructional diagram showing the earth sensor of the second embodiment of the invention. The same reference numerals shall also be applied to the same component elements as those in FIG. 1 and explanations are omitted.

In the diagram, reference numeral 41 denotes a non-cooling two-dimensional array infrared detecting element (infrared detector: hereinbelow, simply referred to as a detecting element) having a plurality of pixels and reference numeral 42 indicates an address controller for pixel address circuit 22.

Figure 5:
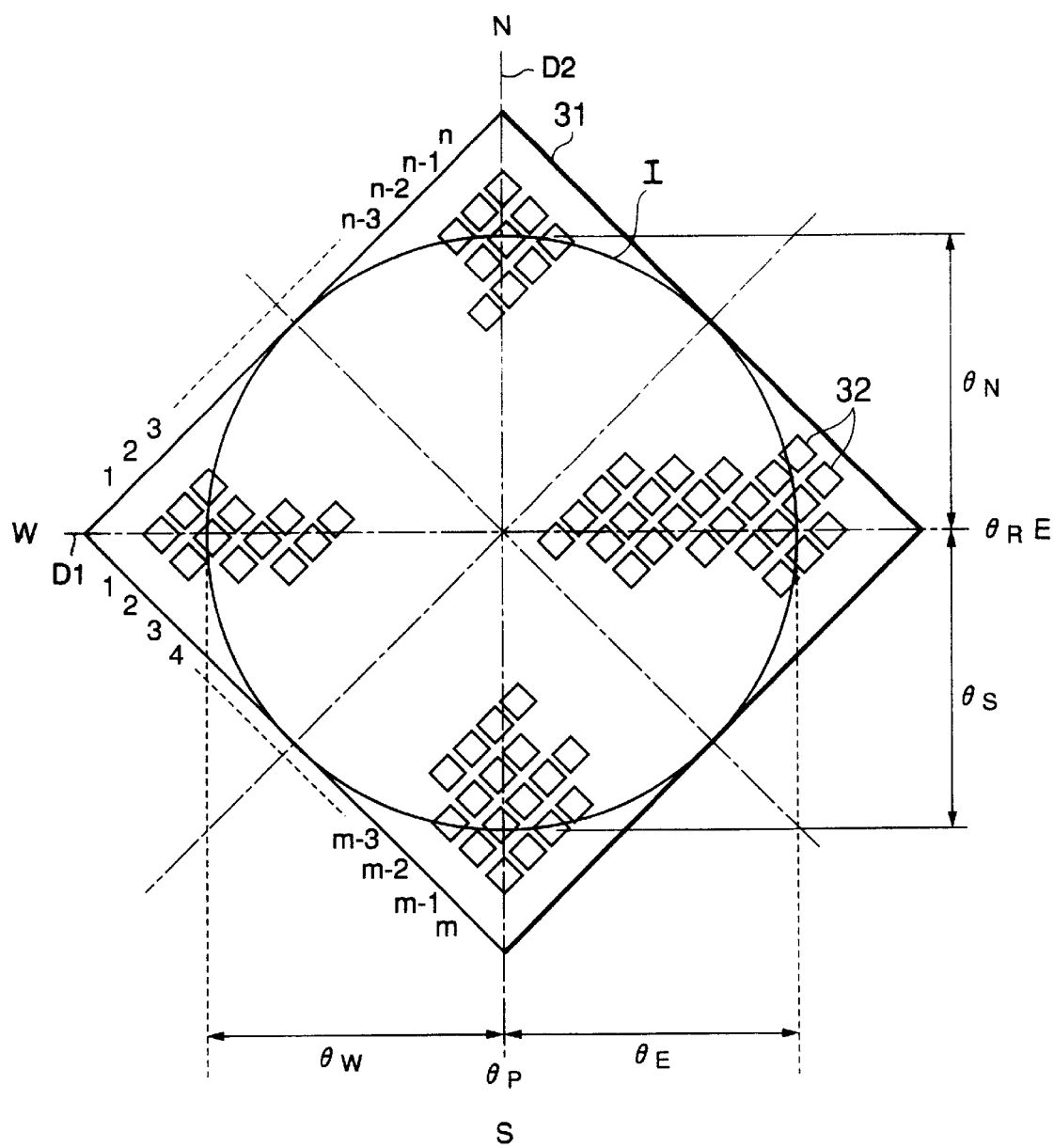
FIG. 5 is a plan view showing a detecting element of the earth sensor of the second embodiment of the invention.

As shown in FIG. 5, the detecting element 41 is placed on the substrate 31 on which the image I of the earth is formed by optical package 12 and detects the image I. The pixels 32 are arranged on the substrate 31 as a matrix of m pixels in the longitudinal direction x n pixels in the lateral direction. An axis of the east and west direction of the earth is set to a diagonal line D1 of those pixels 32 and an axis of the north and south direction of the earth is set to a diagonal line D2, respectively. The pitch angle $\theta_P$ is measured by the pixels 32 on the diagonal line D1 and the roll angle $\theta_R$ is measured by the pixels 32 on the diagonal line D2.

In this instance, the pixels 32 arranged in a matrix manner are expressed by using (m, n). $\theta_W$ denotes an angle on the west side from the optical axis of the earth sensor and, similarly, $\theta_E$ indicates an angle on the east side, $\theta_N$ denotes an angle on the north side, and $\theta_S$ indicates an angle on the south side.

Figure 6:
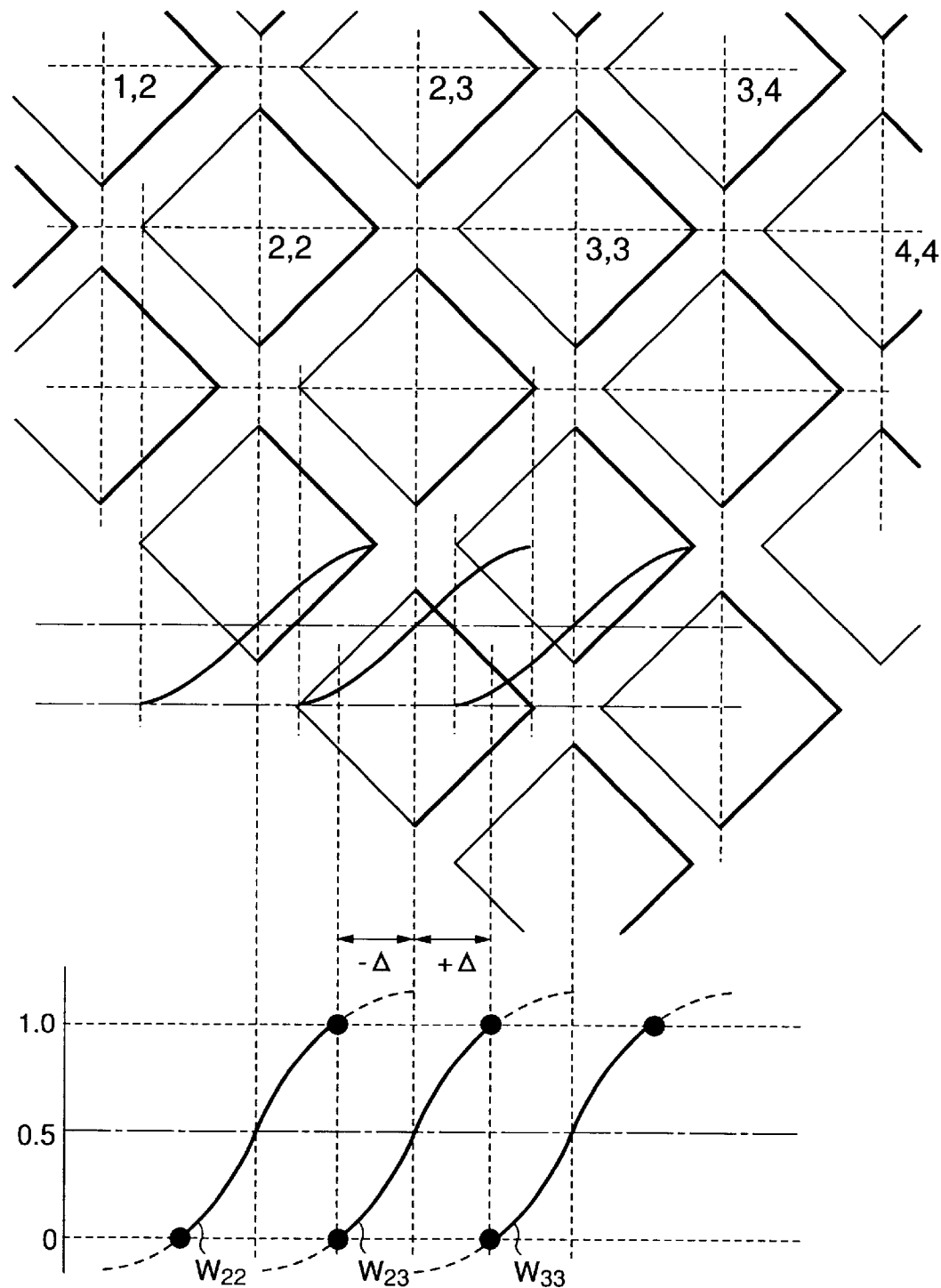
FIG. 6 is a graph showing a relation between pixels and output signals of the detecting element of the earth sensor of the second embodiment of the invention.

FIG. 6 is a diagram showing a relation between the pixels 32 and output signals when the optical axis of the earth sensor is moved on the diagonal line D1 of the pixels 32.

In the earth sensor, the normal electronic scan is executed in accordance with the order of (1, 1), (1, 2), (1, 3), . . . , (1, n–1), (1, n,), (2, 1), (2, 2), . . . , (m, n–1), and (m, n).

After that, as shown in FIG. 6, the data acquired during the normal scan is processed to select pixels in the order needed to produce a synthetic scan along a path (1, 2), (2, 2), (2, 3), (3, 3), (3, 4), (4, 4), . . . . As a result, the scan is now diagonal relative to the individual pixels, and thus, for example, compared to the first scan; the visual field of pixel (2, 3) is as much as $\sqrt{2}=1.41$ times greater in the directions of the pitch angle $\theta_P$ and roll angle $\theta_R$, respectively. Therefore, an angle of visibility of the whole earth sensor can be increased as much as $\sqrt{2}$ times (about 1.41 times).

The effective increase of the center-to-center pixel spacing in the diagonal orientation which increases the angle of visibility also reduces the resolution by $\sqrt{2}$. However, by synthesizing the diagonal (zig-zag) scan (2, 2), (3, 3), (4, 4), (5, 5), the lost resolution can be recovered, and in fact can be raised as much as $\sqrt{2}/2$ or 0.7 times. This will be understood from FIG. 6, in which, the center-to-center distance between, e.g., pixels (2, 3) and (3, 3) in the scan direction is seen to be one-half the center-to-center distance between pixels (2, 3) and (3, 4).

Further, since the pixels in the scan direction are overlapped in two adjacent rows, angle changes can be measured using only the linear portions of the pixel outputs.

Assuming the outputs are normalized as described above, a waveform $W_{22}$ is non-linear near 0 and 1 of the pixel (2, 2) but quite linear near 0.5. Other waveforms such as $W_{23}$ of the pixel (2, 3), are similarly affected. Therefore, the precision of the measured angle between the pixels 32 can be improved compared to the first embodiment.

In the earth sensor as well, the pitch angle $\theta_P$ and roll angle $\theta_R$ can be obtained by the following equations.

$$\theta_P=\tfrac{1}{2}\{\theta_E+V_E-(\theta_W+V_W)\}=\tfrac{1}{2}(\theta_E-\theta_W+V_E-V_W)$$

$$\theta_R=\tfrac{1}{2}\{\theta_N+V_N-(\theta_S+V_S)\}=\tfrac{1}{2}(\theta_N-\theta_S+V_N-V_S)$$

As compared with the earth sensor of the first embodiment in which the pixels 32 of only one line are used, according to the earth sensor of the present embodiment, two lines are used, data is obtained so as to be overlapped, thereby preventing the occurrence of the discontinuity. Simultaneously, non-linear data in both of the upper and lower ends are rejected and the angle is obtained on the basis of data having a good linearity on the center. Consequently, the precision of the measured angle between the pixels 32 is improved and, simultaneously, even when the altitude of the satellite is changed, no discontinuous point occurs on the measured angle and the measuring precision is not changed.

Since the east and west axis of the earth is set to the diagonal line D1 of the pixels 32 of the detecting element 41 and the north and south axis of the earth is set to the diagonal line D2, respectively, the pixel overlap due to the zig-zag scan allows the angle of visibility to be increased as much as $\sqrt{2}$ times with a corresponding resolution increase of up to $\sqrt{2}$ times as compared with those of the earth sensor of the first embodiment. Consequently, the performance is double, in other words, it is equivalent to a detector which contains twice as many pixels as the first embodiment.

As mentioned above, according to the earth sensor of the present invention, since the infrared detector is allowed to have a plurality of pixels arranged at predetermined intervals in the direction which coincides with the scan of the substrate and the direction which crosses the scan at a right angle, respectively, the mechanism such as a conventional mirror drive unit which causes a vibration is eliminated and a fear that the mechanical resonance with the mechanism is caused is eliminated, so that the high precision angle measurement can be executed at a stable state. Therefore, the attitude detection can be stably executed at a high precision.

Since the mechanical vibrating mechanism system such as a conventional mirror drive unit is not needed, it is possible to realize the compactness and light-weightedness.

What is claimed is:

1. An attitude sensing system for an orbiting spacecraft comprised of:
   an imaging device including a substrate on which is formed an image of a body around which the spacecraft is orbiting;
   an infrared detector mounted on the substrate, the detector being comprised of a plurality of pixels disposed in a spaced relationship forming rows and columns, the rows extending in a first direction, and the columns extending in a second direction perpendicular to the first direction;
   a scanner for selectively reading output signals from the pixels in the detector;
   a controller that addresses the scanner, the controller and the scanner being operative to scan the pixels along a scan path which zig-zags between two adjacent pixel rows as it proceeds from column to column; and
   a computation circuit that processes the pixel output signals for a succession of scans along the scan path to calculate pitch and roll angle changes of the spacecraft according to changes in the image of the orbited body in the first and second directions.

2. A method of determining the attitude of an orbiting spacecraft as described in claim 1, wherein the detector is scanned electronically.

3. An attitude sensing system as described in claim 1, wherein the computation circuit calculates pitch angle changes of the spacecraft according to changes in the image of the orbited body in the first direction and calculates roll angle changes of the spacecraft according to changes in the image of the orbited body in the second direction.

4. An attitude sensing system as described in claim 1, wherein the infrared detector is comprised of a rectangular array oriented on the substrate at an angle relative the first and second directions.

5. An attitude sensing system as described in claim 4, wherein the rectangular array is oriented on the substrate substantially at a 45 degree angle relative to the first and second directions.

6. An attitude sensing system as described in claim 1, wherein successively scanned pixels overlap each other in the first and second directions.

7. An attitude sensing system as described in claim 1, wherein the scan path proceeds from a first pixel located in a first column and in a first row; to a second pixel located in a second column adjacent to the first column and in a second row adjacent to the first row, to a third pixel located in a third column adjacent to the second column, and in the first row, and then to pixels located in successive columns, and alternating between in the second and the first rows, for all of the columns.

8. An attitude sensing system as described in claim 6, wherein:
   the controller and the scanner are operative to scan the pixels along a an electronic scan path which proceeds in the first direction from the pixel in the first row and the first column along the first row to the last column, along the second row from the first column to the last column, and thereafter along successive rows from the first column to the last column until all pixels have been scanned; and
   the computation circuit processes the pixel output signals for the electronic scan path in the order corresponding to the zig-zag scan path to calculate the pitch and roll angle changes of the spacecraft.

9. An attitude sensing system as described in claim 7, wherein:
   the controller and the scanner are operative to scan the pixels along a further scan path which proceeds in the first direction from the pixel in the first row and the first column along the first row to the last column, along the second row from the first column to the last column, and thereafter along successive rows from the first column to the last column until all pixels have been scanned; and
   the computation circuit processes the pixel output signals for the succession of scans along the further scan path to calculate the pitch and roll angle changes of the spacecraft.

10. An attitude sensing system as described in claim 1, wherein the infrared detector is a non-cooled two dimensional array.

11. An attitude sensing system as described in claim 1, wherein the detector array is electronically scanned.

12. A method of determining the attitude of an orbiting spacecraft comprising the steps of:
   forming an image of a body around which the spacecraft is orbiting on an infrared detector, the detector being comprised of a plurality of pixels disposed in a spaced relationship forming rows and columns, the rows extending in a first direction, and the columns extending in a second direction perpendicular to the first direction;
   selectively reading output signals from the pixels in the detector;
   calculating pitch angle changes of the spacecraft according to changes in the image of the orbited body in the first direction; and
   calculating roll angle changes of the spacecraft according to changes in the image of the orbited body in the second direction,
   the changes in the image of the orbiting body in the first and second directions being reflected in changes in the output signals from the pixels in the detector along a predetermined scan path,
   the predetermined scan path moving from a first pixel located in a first column and in a first row, along a zig-zag path between two adjacent pixel rows as it proceeds from column to column.

13. A method of determining the attitude of an orbiting spacecraft as described in claim 11, wherein successively scanned pixels overlap each other in the first and second directions.

14. A method of determining the attitude of an orbiting spacecraft as described in claim 12, wherein the scan path proceeds from a first pixel located in a first column and in a first row; to a second pixel located in a second column adjacent to the first column and in a second row adjacent to the first row, to a third pixel located in a third column adjacent to the second column, and in the first row, and then to pixels located in successive columns, and alternating between in the second and the first rows, for all of the columns.

15. A method of determining the attitude of an orbiting spacecraft as described in claim 14, wherein, after the scan path reaches a final column, it thereafter proceeds to a pixel located in the first column and in the second row; to another pixel located in the second column and in a third row adjacent to the second row, to a further pixel located in a fourth column adjacent to the third column, and in the second row, and then to pixels located in successive columns, and alternating between in the third and the second rows, and thereafter, to successive pairs of overlapping rows for all of the columns until all pixels have been scanned.

16. A method of determining the attitude of an orbiting spacecraft as described in claim 12, wherein the infrared detector is comprised of a rectangular array oriented at an angle relative the first and second directions.

17. A method of determining the attitude of an orbiting spacecraft as described in claim 11, wherein the rectangular array is oriented substantially at a 45 degree angle relative to the first and second directions.

18. A method of determining the attitude of an orbiting spacecraft as described in claim 13, wherein:

the signal outputs of the pixels are read along a path which proceeds in the first direction from the pixel in the first row and the first column along the first row to the last column, along the second row from the first column to the last column, and thereafter along successive rows from the first column to the last column until all pixels have been scanned; and the pixel output signals are processed in the order corresponding to the predetermined scan path to calculate the pitch and roll angle changes of the spacecraft.

19. A method of determining the attitude of an orbiting spacecraft as described in claim 12, wherein the infrared detector is a non-cooled two dimensional array.

* * * * *